Sept. 3, 1963 K. N. SCHACHT ETAL 3,102,623
ESCAPE SLIDE
Filed March 31, 1960
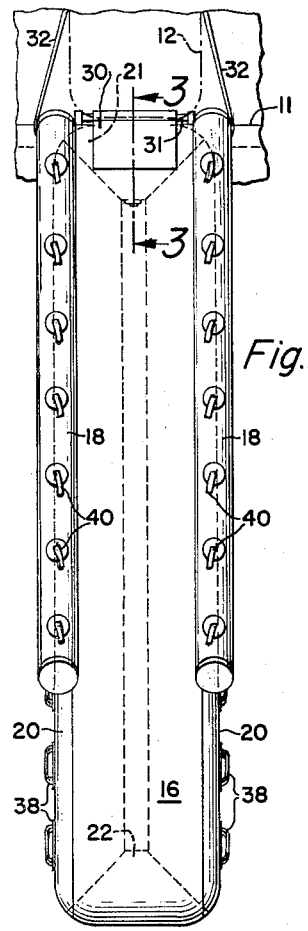
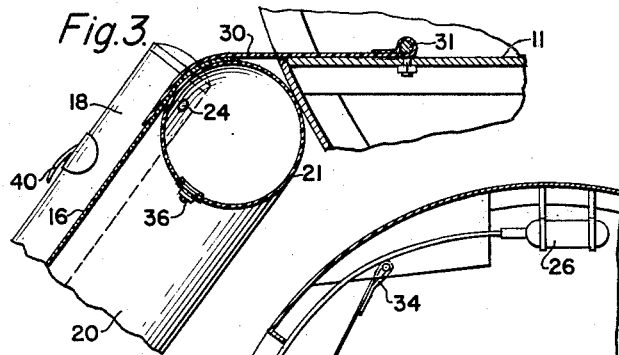
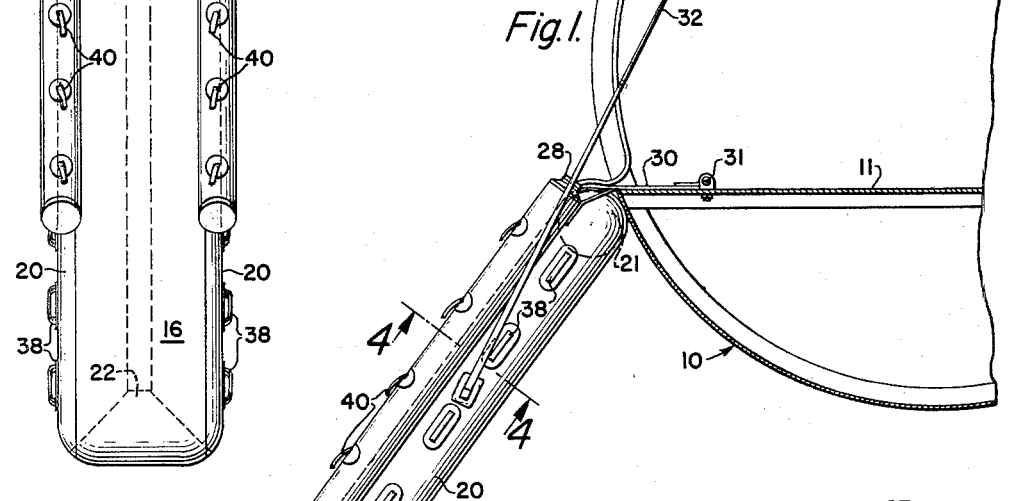
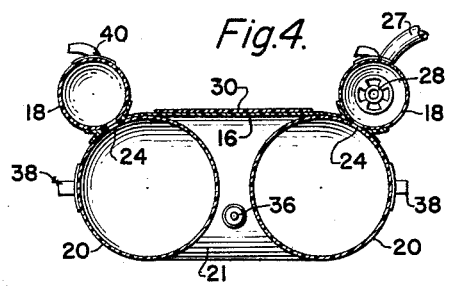
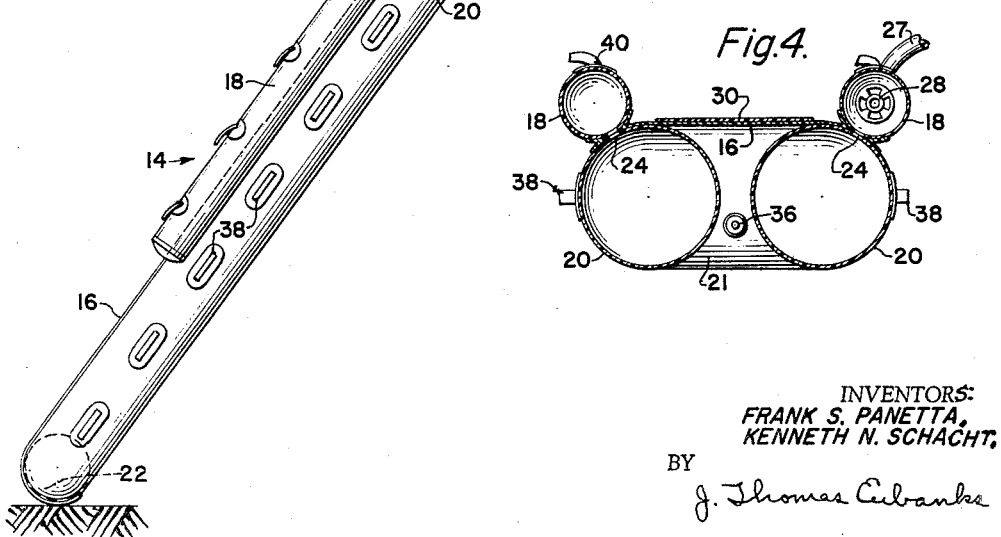
INVENTORS:
FRANK S. PANETTA,
KENNETH N. SCHACHT,
BY
J. Thomas Eubanks
Attorney.

United States Patent Office 3,102,623
Patented Sept. 3, 1963

3,102,623
ESCAPE SLIDE
Kenneth N. Schacht, Neptune, and Frank S. Panetta, Lakewood, N.J., assignors to The Garrett Corporation, Los Angeles, Calif., a corporation of California
Filed Mar. 31, 1960, Ser. No. 19,094
3 Claims. (Cl. 193—25)

This invention relates to a slide for facilitating the safe escape of persons or removal or loading of cargo from or aboard a vehicle where no stairs, ramp, dock, bridge or gangplank is available.

Although the invention is described as an escape slide for facilitating the safe escape of persons or for the removal of cargo from an aircraft, it is obvious that the slide is also susceptible of being used on buildings and structures and in other situations calling for an available emergency slide, a ramp for loading or unloading, or a bridge.

When an aircraft makes an emergency or crash landing, there is always danger that the fuel may ignate and/or explode at any time thereafter. It is therefore desirable that means be provided to exacuate the passengers and crew in the shortest possible time. In such a landing the door of the aircraft is often high above the ground and, when no rigid stairway or ramp is available, some quick emergency escape means, such as an escape chute or slide, must be provided.

One such escape means that has heretofore been proposed for use in case of an emergency landing is the inflatable escape chute shown in the Boyle U.S. patent No. 2,765,131. This chute is adapted to be launched and manned from the aircraft and can be inflated within a very short time to form a rigid slide, ramp or bridge from the door of the aircraft to the ground.

The inflatable escape chute shown in the aforementioned Boyle patent is formed of a large, inflatable middle tube and a pair of cross-sectional smaller side tubes, the three tubes being bonded together to form a trough-shaped chute. The slide-way surface in the chute shown in the Boyle patent is formed on the middle tube and its width is directly related to, and determined by, the size of the middle tube. When a wide slide-way surface is required, the middle tube must be made very large. A large chute of this type is difficult to handle and stow.

Furthermore, since the slide-way surface in the chute shown in the Boyle patent is formed on the surface of the middle tube, it is therefore rounded. This convex surface does not lend stability to a person or to freight sliding on the escape chute.

It is an object of the present invention to overcome the foregoing and other disadvantages of the prior art by providing an escape slide having a trough-shaped slide-way formed of an elongated strip of material and a pair of spaced longitudinally extending side rails. The trough-shaped slide-way is supported on an inflatable supporting structure which has sufficient strength when inflated to support the weight of a load carried on the slide. Means are provided for supporting one end of the slide-way supporting structure at a distance from a supporting surface such as the ground, the other end of the structure resting upon the supporting surface.

It is a further object of the invention to provide an escape slide of the above described type having two spaced beams on the supporting structure arranged to hold the strip of material taut so as to provide a laterally flat slide-way surface when the supporting structure is inflated.

It is a still further object of the invention to provide an escape slide of the above described type that is light in weight and is adapted to be compactly stowed and carried in a relatively small space in the aircraft or other structure.

Other and further objects of the present invention will become apparent from the disclosures in the following detailed specification, appended claims and accompanying drawings, wherein:

FIG. 1 is an elevational view of the escape slide in operative relation to the aircraft;
FIG. 2 is a front view of the slide shown in FIG. 1;
FIG. 3 is an enlarged sectional view of the escape slide shown in FIG. 2 taken along line 3—3 thereof; and
FIG. 4 is a cross section of the escape slide shown in FIG. 1 taken along lines 4—4 thereof.

Referring to the drawing, there is shown an airplane or other aircraft having a body 10, a floor 11, and a door opening 12. The door itself, being outwardly opening, is not shown.

An escape slide, shown generally at 14, is attached to the aircraft by means hereinafter described. The escape slide includes an elongated strip of material 16, such as canvas, forming a slide-way surface and two inflatable fabric side tubes 18, 18 secured on the strip of material to form a trough-shaped slide-way.

The strip of material 16 and the side tubes 18 are supported on an inflatable supporting structure, indicated generally at 19, comprising two longitudinally extending inflatable beams 20, 20 which are held in spaced parallel relationship by an inflatable top spacer tube 21 and an inflatable bottom spacer tube 22. The strip of material 16 is disposed on the side beams 20, 20 and on the top and bottom spacer tubes 21 and 22, so that the material is drawn taut to form a laterally flat and quite rigid slide-way surface when the supporting structure is inflated. Thus the slide-way surface is formed with no sag and, except for a slight bending which may occur due to the weight of a person or cargo sliding on it, forms a smooth surface for the person or cargo. It is to be further noted that the width of the slide may be varied without changing the size of the beams in the supporting structure and may, for psychlogical or physical reasons, be made as wide, or wider than, the exit door of the aircraft. The side tubes 18 are a further psychological and physical safety item and prevent persons or cargo from falling off the slide. As shown in FIG. 1, the side tubes may end a distance from the bottom of the slide to provide a person free exit in all directions when he reaches the bottom of the slide.

Each of the inflatable side tubes 18 are longitudinally secured to one of the inflatable beams 20 and communicates with its interior through a plurality of holes 24. A compressed air cylinder 26, which may be secured to a portion of the aircraft structure as shown in FIG. 1, is connected by a flexible air hose 27 to an aspirator type jet pump 28 which may be mounted on the upper end of one or both, of the side tubes 18. The aspirator 28, is adapted to eject a jet of air from the cylinder 26, and atmosphere air entrained by the jet, into the member 18. Air then passes from the member 18 through the holes 24 into beam 20 and thence into the top and bottom spacer tubes 21 and 22.

The construction and operation of aspirator type inflators suitable for this use are known in the art, an example being shown and described in the Crawford et al. U.S. patent, No. 2,772,829.

At the upper end of the slide, one end of a fabric sheet 30 is secured to the strip of material 16 at its juncture with the top spacer tube 21, as shown in FIG. 3. The other end of the sheet 30 is adapted to be attached or secured to a bar 31, or to other attachable means which may be releasably secured to a portion of the airplane, such as the floor 11. A pair of straps or bracing lines, such as lines 32 shown in FIGS. 1 and 2, are secured at their lower end to the beams 20. At their upper ends the lines 32 are provided with a releasable loop 34 for engagement with a suitable fastener located on the aircraft. The lines 32 assist in stabilizing the slide both in the non-inflated condition and in the inflated condition.

When the side tubes 18 and the supporting beams 20, 21 and 22 have been inflated to a preselected pressure, excess air pressure caused by expansion of the air or additional air entering the tubes or beams must be relieved. A relief valve 36 is therefore provided at any convenient location, such as in the top beams 21, to dump the excess air pressure and to prevent bursting of the structure.

In case the aircraft is in danger of sinking, the slide can be cast adrift from the aircraft by releasing the loop 34 and the bar 31 and disconnecting or severing the inflatable air hose 27. The beams 20 are provided with fabric hand loops 38 for manipulating the chute and also to provide something for the survivors to hold on to in case the slide must be used as a float. Handles 40 are provided on the side tubes 18 to aid in walking up the slide and entering the aircraft or structure for rescue purposes, or to aid in climbing up the slide from the structure in case the supporting surface at the free end of the slide is higher than the exit door of the structure.

The slide may be folded for storage in the structure in any manner well known in the prior art.

We claim:

1. A slide for a structure comprising: a longitudinally extending elongated strip of material; an inflatable supporting structure having a pair of spaced inflatable structural beams arranged to support said strip of material therealong and adapted to hold said strip of material taut to form a laterally flat slideway surface when said supporting structure is inflated; longitudinally extending side rails associated with said structural beams and arranged contiguous the longitudinal edges of said strip of material; and means for attaching one end of the slide to the structure at a distance from a supporting surface.

2. A slide for a structure comprising: a longitudinally extending elongated strip of material; an inflatable supporting structure having a pair of spaced inflatable structural beams arranged to support said strip of material therealong and adapted to hold said strip of material taut to form a laterally flat slideway surface when said supporting structure is inflated; longitudinally extending inflatable side rail tubes disposed contiguous the longitudinal edges of said strip of material and communicating with said structural beams; and means for attaching one end of the slide to the structure at a distance from a supporting surface.

3. A slide for a structure comprising: a longitudinally extending elongated strip of material; an inflatable supporting structure having a pair of spaced inflatable structural beams arranged to support said strip of material therealong and adapted to hold said strip of material taut to form a laterally flat slideway surface when said supporting structure is inflated; inflatable means associated with said supporting structure and arranged to hold said structural beams in substantially parallel relationship when said supporting structure is inflated; longitudinally extending inflatable side rail tubes disposed contiguous the longitudinal edges of said strip of material and communicating with said structural beams; and means for attaching one end of the slide to the structure at a distance from a supporting surface.

References Cited in the file of this patent
UNITED STATES PATENTS
2,936,056 Heyniger _____ May 10, 1960
FOREIGN PATENTS
580,453 Canada _____ July 28, 1959